Figure 1:
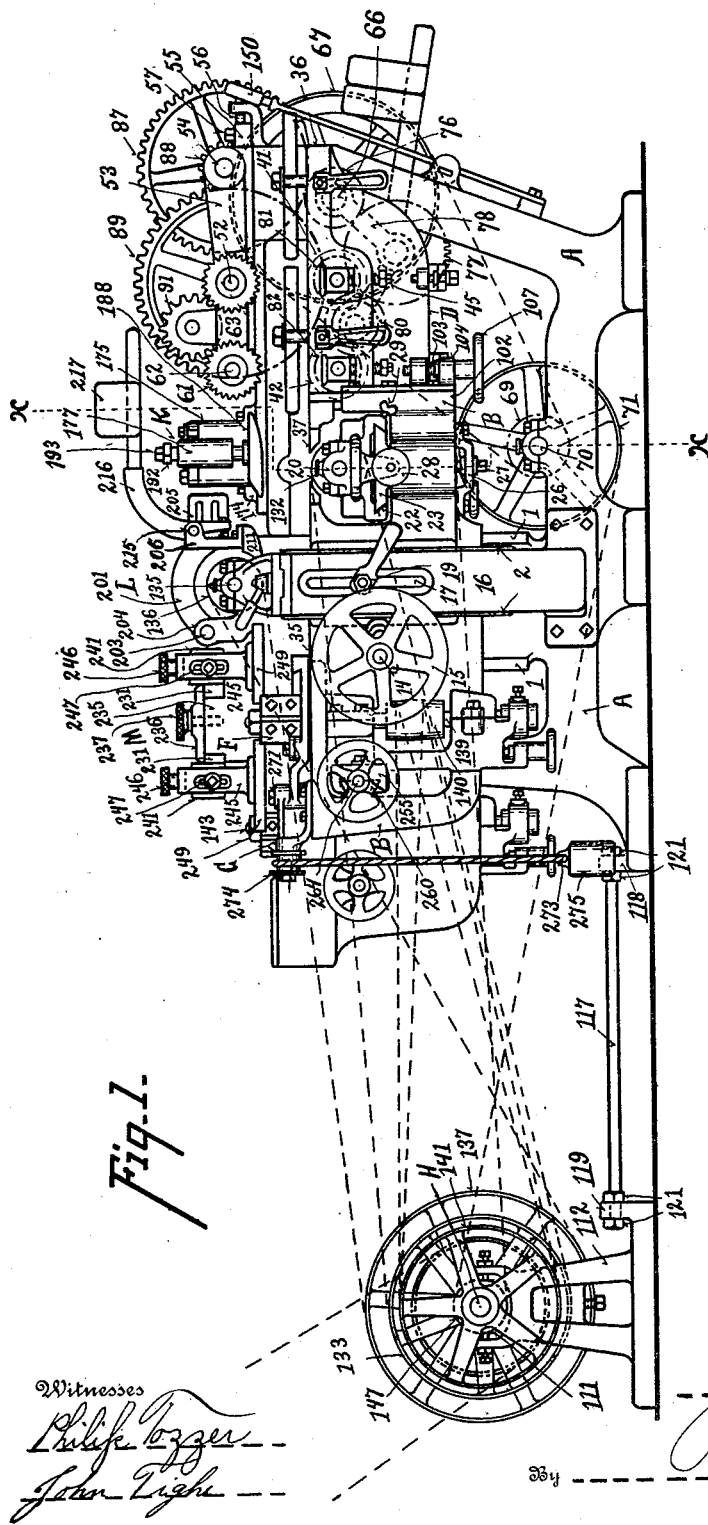

No. 706,130. Patented Aug. 5, 1902.
J. R. THOMAS.
MOLDING MACHINE.
(Application filed May 29, 1901.)
(No Model.) 5 Sheets—Sheet 1.

Witnesses
Philip Tozzer
John Tighe

Inventor
John R. Thomas
By _____ Attorney

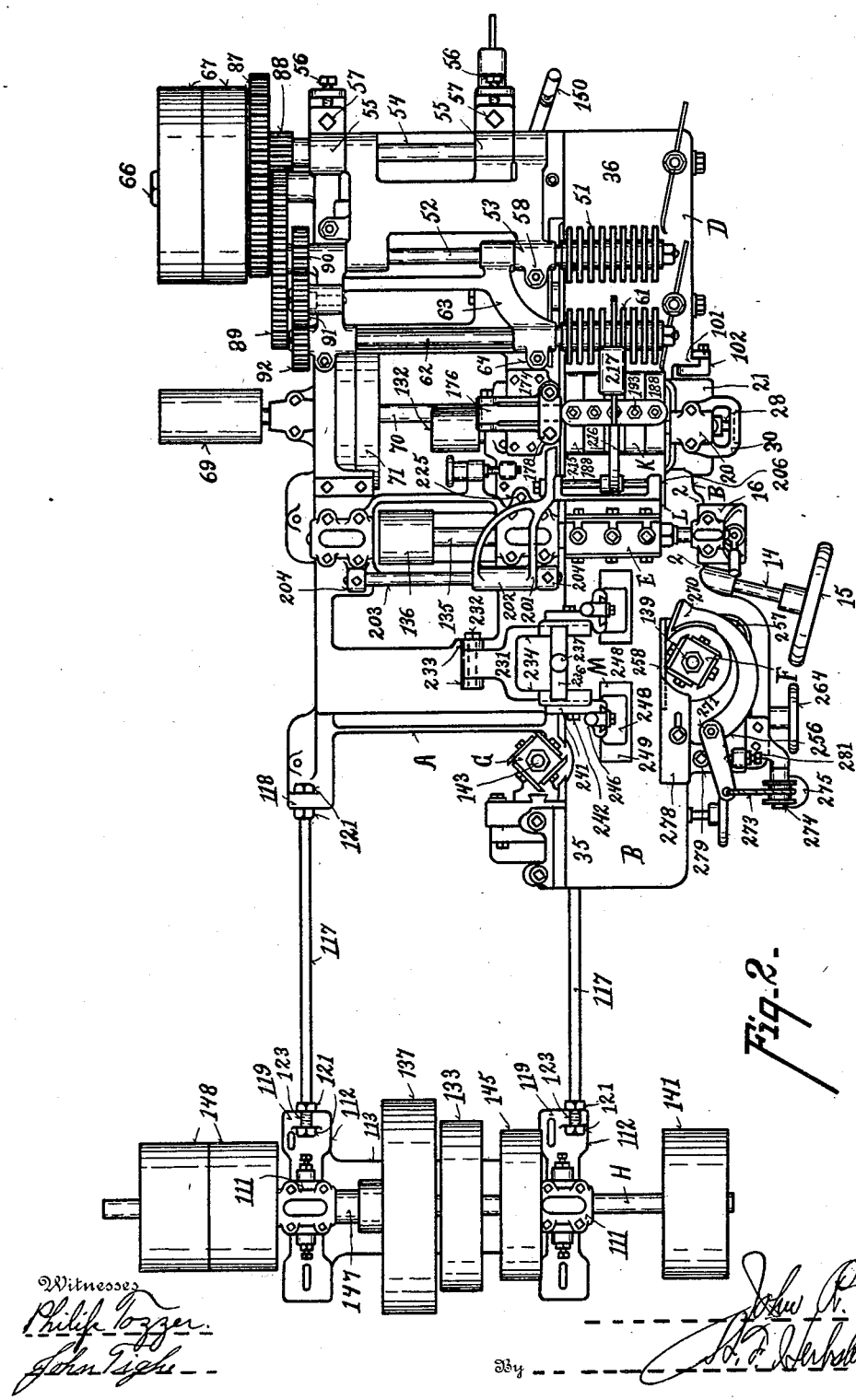

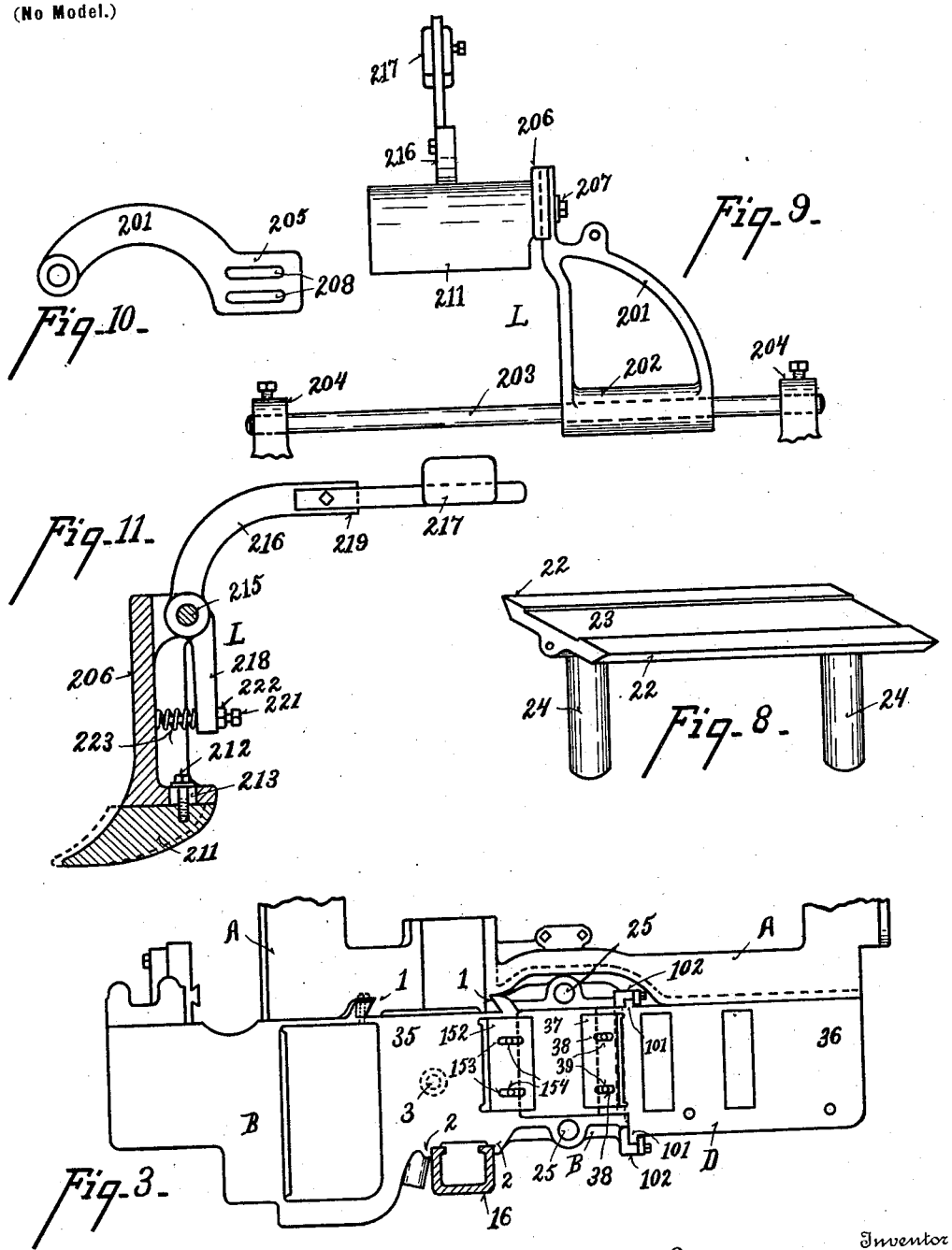

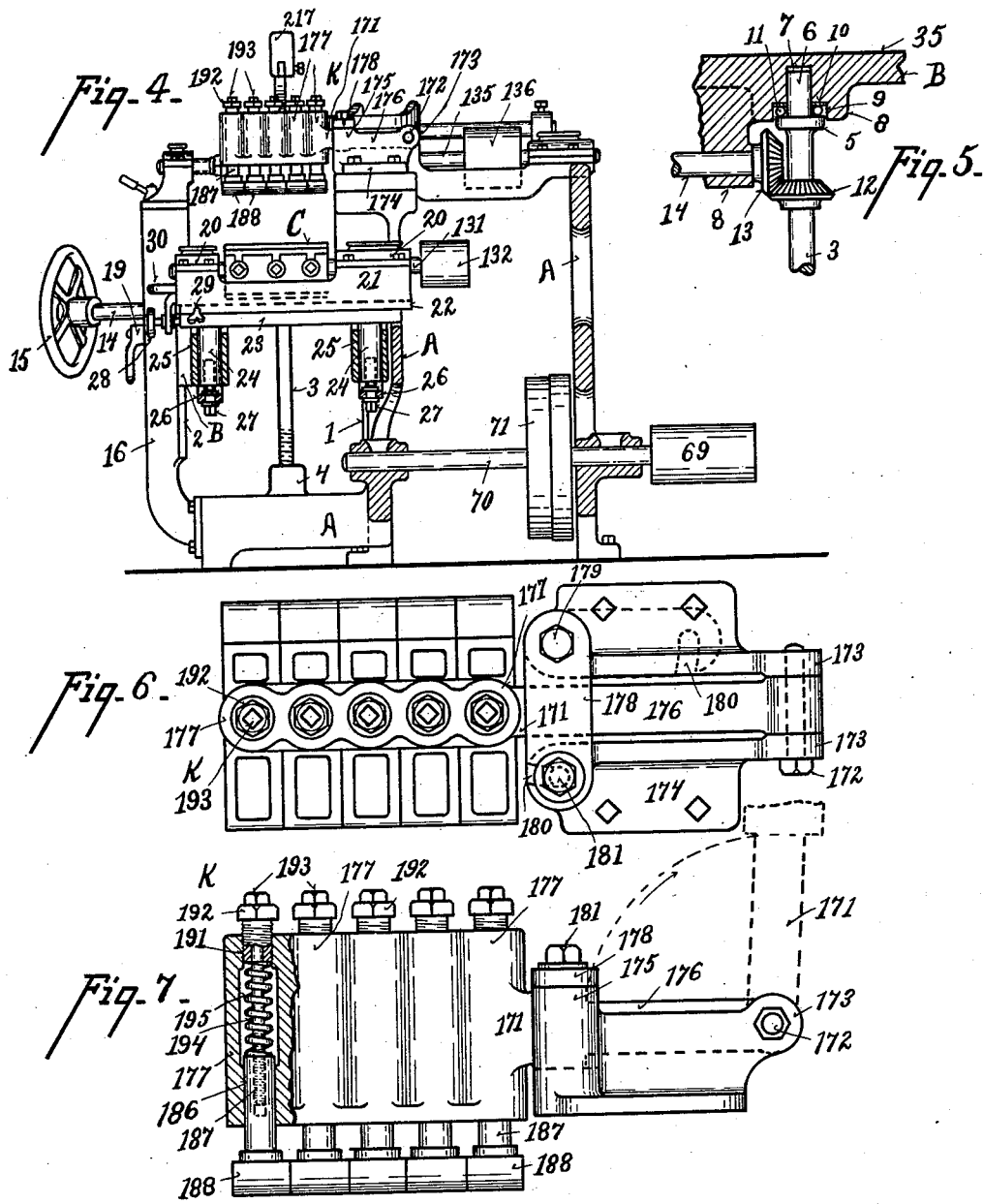

No. 706,130. Patented Aug. 5, 1902.
J. R. THOMAS.
MOLDING MACHINE.
(Application filed May 29, 1901.)
(No Model.) 5 Sheets—Sheet 5.
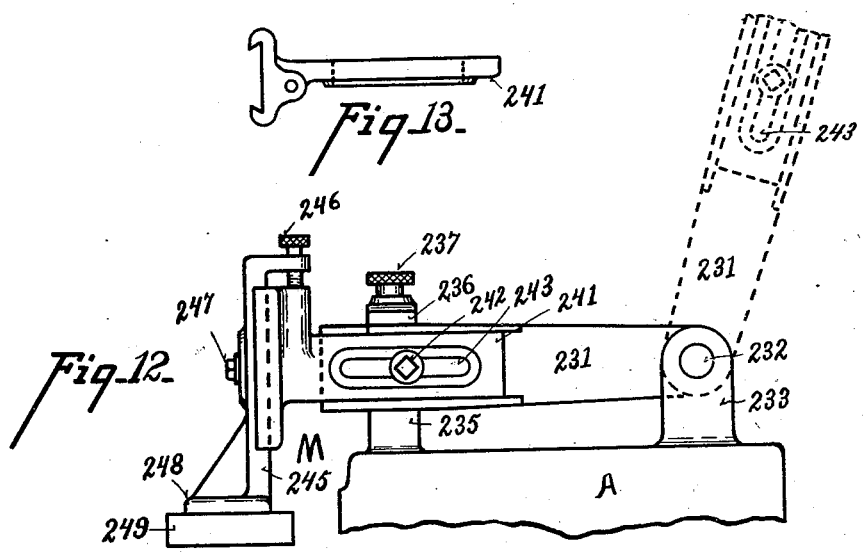
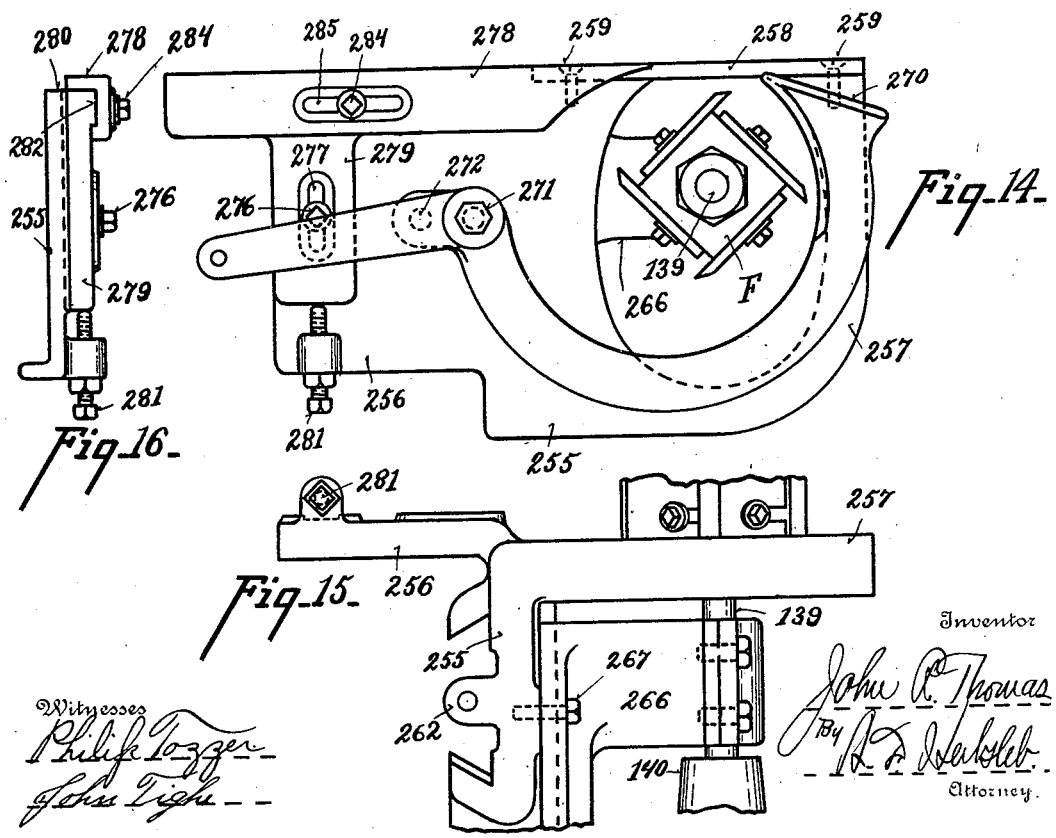

UNITED STATES PATENT OFFICE.

JOHN R. THOMAS, OF CINCINNATI, OHIO, ASSIGNOR TO J. A. FAY & EGAN COMPANY, OF CINCINNATI, OHIO, A CORPORATION OF WEST VIRGINIA.

MOLDING-MACHINE.

SPECIFICATION forming part of Letters Patent No. 706,130, dated August 5, 1902.

Application filed May 29, 1901. Serial No. 62,413. (No model.)

*To all whom it may concern:*

Be it known that I, JOHN R. THOMAS, a citizen of the United States, residing at Cincinnati, in the county of Hamilton and State of Ohio, have invented certain new and useful Improvements in Molding-Machines, of which the following is a specification.

My invention relates to molding-machines of the character in which preferably the four sides of stock are planed to suitable configuration at one passage of the same through the machine and which are adapted to provide one or more faces of the stock with a wide range of depth of cut for producing stocks having wide differences in configurations of surface.

It relates especially to that type of molding-machines of the character described known as "outside" molding-machines.

In outside molding-machines—i. e., molding-machines in which the stock-supporting bed or table frame is located to the outside of the main frame of the machine—it has been the practice to extend the main frame at the feed-in end of the machine in order to journal a counter-shaft in its extreme feed-in end, the pulleys of which counter-shaft serve the purpose of turning the various cutter-heads and the feed by means of belts passing from the counter-shaft to the cutter-head and feed-shaft pulleys. Mounting the counter-shaft at the extreme feed-in end of a machine of this character has resulted in various disadvantages, namely: first, the counter-shaft and the extending frame are in the way of the operator, who in feeding stock into the machine and especially short stock should stand in about the position occupied by the counter-shaft; second, in interference between belts from the counter-shaft to the cutter-head spindles (especially those of the side cutter-head spindles) and the frame or other parts of the machine, it being understood that provision must be made for adjustment sidewise, especially of the outside cutter-head and consequent range of clearance for its belt; third, consequent difficulty in designing and constructing a machine of this character, resulting often in inability to provide the proper braces or requisite amount of metal in machine parts to obtain the desired substantial construction, and, fourth, consequent limitation in position for the operative parts of a machine of this character. By means of my improved device I obviate these difficulties and disadvantages and provide a machine of the character described in which I am enabled to accurately counterbalance the inner frame upon its slideways, so as to prevent undue binding and provide easy manipulation of the parts and accurate adjustment, which latter is a prerequisite to doing accurate work.

My invention consists, therefore, in providing a machine of the character described with a counter-shaft at its feed-out end and in the connections between the counter-shaft frame and the machine-frame; further, in providing the outer secondary frame of a machine of this character with a lower cutter-head cutting in advance, and thereby providing the lower side of the stock arranged to travel on the table of the machine in the operation of the subsequent cutters upon the stock with a regular under surface by which the stock may be gaged in its subsequent operations, and also permitting the more accurate counterbalancing of the outer secondary frame upon its slideways; further, in providing a supplemental frame for the outer secondary frame for forming a feed-table in front of the lower cutter-head with means for adjusting this feeding-in table up and down for different thicknesses of cut and to permit so-called "profile" cutting, in which the lower head swings long knives for making deep cuts in parts of the under side of stock.

My invention consists, further, in the parts and in the construction, arrangement, and combinations of parts hereinafter more fully described and claimed.

I have also herein shown and described improved means whereby the various cutter-heads may be readily exposed for replacing, adjustment, sharpening, or other operations of their knives and for exposing the adjacent parts for manipulation thereof, but have made the same the subject of divisional applications hereof, in which the same are more fully shown, described, and claimed, the subject-matter relating to the pressure-bar over the lower cutter-head and adjacent parts being embraced in divisional application Serial No. 87,020, the subject-matter relating to the chip-breaker for the upper cutter-head and adjacent parts being embraced in divisional application Serial No. 87,022, and the subject-matter relating to the holddown device between the side heads and adjacent parts being embraced in divisional application Serial No. 87,021, all executed under date of December 14, 1901.

In the drawings, Figure 1 represents a side elevation of my improved device. Fig. 2 is a plan view of the same. Fig. 3 is a skeleton plan view representing the connection between the main and outer secondary frames. Fig. 4 is a transverse section taken on the line x x of Fig. 1. Fig. 5 is a detail of screw-shaft for adjusting the outer secondary frame. Fig. 6 is a plan view of the pressure device for the lower cutter-head. Fig. 7 is a side elevation of the same, partly in section. Fig. 8 is a view in perspective of the saddle for the lower cutter-head yoke. Fig. 9 is a view in side elevation showing the chip-breaker for the upper cutter-head in raised position. Fig. 10 is a detail in side elevation of the swinging frame for the same. Fig. 11 is a detail in side elevation, partly in section, of the chip-breaker with its weighting arrangement. Fig. 12 is a view in side elevation of the holddown device between the side cutter-heads. Fig. 13 is a detail of a slide for the same. Fig. 14 is an enlarged plan view of the outside side cutter-head slide with the parts mounted thereon. Fig. 15 is a side elevation of the same with the lower part of the cutter-head, saddle, and spindle broken away; and Fig. 16 is an end view of the slide and side gage mounted thereon.

A represents the main frame, in which an outer secondary frame B is mounted so as to be adjustable up and down on ways 1 2, the adjustment being accomplished by means of a screw-shaft 3, taking through and turning in an interiorly-threaded lug 4, secured to the bottom of the frame and at its upper end having a step 5 and a journal extension 6, the latter taking into an opening 7 in a lug 8 at the bottom of the outer secondary frame, the lug being also provided with a pocket 9, in which a steel washer 10 and balls 11 may be placed, the latter resting on the step 5. The screw-shaft 3 also carries a bevel-gear 12, meshing with similar bevel-gear 13 on the shaft 14, supporting a hand-wheel 15 for turning the screw-shaft 3, and thereby raising and lowering the outer secondary frame with relation to the frame proper. The outer ways 2 may be on a bracket 16, extending from the frame of the machine. A slot 17 is in the bracket, with a bolt extending from the outer secondary frame through the slot, with a nut 19 at its outer end for rigidly securing the outer secondary frame in position after adjustment.

I mount the lower cutter-head C in bearings 20 on a yoke 21, which is permitted to be slid longitudinally on ways 22 on a saddle 23, having posts 24 taking into sockets 25. The sockets 25 have caps 26 at their bottom. Adjusting-screws 27 are collared to the caps and take into internally-threaded apertures in the posts for giving vertical adjustment to the saddle and cutter-head. An adjusting-bolt 28 is provided for limiting the inward movement of the yoke and a set-bolt 29 for securing the yoke in position. A grip 30 is provided for the yoke, by which the yoke is adapted to be gripped when sliding the same longitudinally. The object of thus sliding the yoke and cutter-head longitudinally is to expose the cutter-head or remove the same entirely from the machine.

I provide the ways 1 and 2 and the screw-shaft 3 in substantially the middle in weight longitudinally of the outer secondary frame, so that the feeding-in end and the feeding-out end may be substantially counterbalanced by each other. To aid me in doing this and also for the purposes hereinafter explained, I mount the lower cutter-head C in advance of the other cutter-heads to take the weight from the feeding-out end and transfer it to the feeding-in end of the outer secondary frame. I also provide the feeding-in end of the outer secondary frame with a supplemental frame D, the upper surface of which forms a feeding-in table 36 in advance of the lower cutter-head C, with a lip 37 adjustable on the supplemental frame to and from the lower cutter-head by means of bolts 38, taking through slots 39 in the lip and into the supplemental frame. Mounting the lower cutter-head at the feed-in end of the table in a machine of this character permits the under side of the stock to be cut in advance to provide it with a regular under surface for acting as a gage in the subsequent cutting operations. Giving the feeding-in table in advance of the lower cutter-head a wide range of adjustment by mounting the same on an adjustable frame adjustable from the outer secondary frame permits so-called "profile" cutting in convenient manner. In profile cutting large and deep cuts are taken from the under side of the stock, making it necessary to provide a channel or support for the stock on the table proper, 35, of a shape reverse to that of the profile cut, and therefore necessitating the raising of the stock above the table proper to allow for the insertion of the support between the stock and table. In order that the stock in front of the lower cutter-head may be properly supported in a horizontal plane corresponding to the horizontal plane of the support, I provide the wide range of adjustment for the supplemental frame in advance of the lower cutter-head, so that the feed-in table may be raised, and feed the stock in the horizontal plane of the support. The supplemental frame also has lower feed-rolls 41 42, journaled in boxes, adjustable by means of bolts 45 for raising or lowering the feed-rolls with relation to the table. An upper feed-roll 51 has shaft 52 mounted in a yoke 53, swingingly supported on a shaft 54, journaled in boxes 55, adjustable on the frame of the machine by means of bolts 56 and held in place by bolts 57. The bolts 56 are adapted to adjust the upper feed-roll housing to give proper lead to the feed-rolls. Bolt 58, whose lower end is adapted to take against the frame of the machine, serves to limit the downward movement of the roll 51. A second upper feed-roll 61 has a shaft 62 journaled in a housing 63, swinging upon the shaft 52, the downward limit of which is adjusted by a bolt 64. The feed-rolls are driven from a shaft 66, having thereon tight and loose pulleys 67, receiving motion by means of a belt passing thereover and over a pulley 69 on a shaft 70, which latter also supports suitable cone or other pulley 71, receiving motion from the counter-shaft, hereinafter described. The shaft 66 carries a pinion 76, meshing with a gear 77, mounted in an expansion device 78, extending from the shaft 76 to the shaft of a transmitting-gear 80, which meshes with gears 81 82 on the shafts of the lower rolls 41 42. Shaft 66 also carries a pinion at its rear end below and meshing with a gear 87 on shaft 54, which also carries a pinion 88, meshing with a gear 89 on shaft 52, which latter also carries a gear 90, meshing with a transmitting-gear 91, transmitting motion to a gear 92 on shaft 62. The shaft 66 turns with its upper face toward the feed-out end of the machine, and the point of engagement between the gears on the feed-roll shafts and the gears immediately meshing therewith is at a greater distance from the horizontal plane of the stock passing through the machine than is the axis of the roll, thereby gearing the rolls so that the pressure exerted by the gears will be toward the stock and exert greater power on the stock for feeding it through the machine and driving the upper feed-rolls down.

The supplemental frame D has guides 101 sliding in ways 102 of the outer secondary frame and is adjustable up and down on the latter by means of a screw-shaft 103, collared to a lug 104 and taking into an internally-threaded aperture of a lug on the supplemental frame, a hand-wheel 107 being provided for the screw-shaft.

The cutter-heads are designated by the letters C, E, F, and G, and for the reasons stated I have the lower cutter-head C cutting first. H is a counter-shaft journaled in suitable bearings 111, adjustable in stands 112, which may have a connection 113 for forming a counter-shaft yoke. The bearings 111 are adjustable vertically and horizontally. Connecting rods or braces 117 may take through lugs 118 on the machine and lugs 119 on the counter-shaft yoke. Adjusting-nuts 121 are provided for alining the counter-shaft with relation to the machine. The lugs 119 may be split, as shown at 123, for readily receiving the connections 117. The cutter-head C is mounted on a shaft 131, carrying a pulley 132, belted from a pulley 133 on the counter-shaft. The cutter-head E is mounted on shaft 135, carrying a pulley 136, belted from a pulley 137 on the counter-shaft. The cutter-head F is mounted on a shaft 139, which carries a pulley 140, belted from a pulley 141 on the counter-shaft. This latter pulley is adjustable sidewise on the counter-shaft to correspond to sidewise adjustment that may be made of the hand. The cutter-head G is mounted on a shaft 143, which carries a pulley similar to pulley 140, belted from a pulley 145 on the counter-shaft. A suitable cone or other pulley 147 is mounted on the counter-shaft for transmitting motion by belt to the pulley 71 for the feed. Tight and loose pulleys 148 are also mounted on the counter-shaft, motion being transmitted to the same from any suitable source of power.

In practice the side cutter-heads in a machine of this character perform the lightest service, heavier cuts being taken by the upper and lower cutter-heads. In practice it is also desirable to provide longer belts for shafts performing heavier duty. In my improved construction, therefore, I provide shorter belts for the cutter-heads performing the lighter service and longer belts for the cutter-heads performing the heavier service by placing the upper and lower cutter-heads in advance of the side heads and placing the counter-shaft at the feed-out end of the machine, thereby also clearing the feed-in end of the machine of obstruction. My improved construction also permits adjustment of the counter-shaft with relation to the cutter-heads and affords a means for bracing the counter-shaft and the frame with relation to each other, forming a substantial construction permitting smooth operation. I am also enabled by means of my improved construction to mount the lower cutter-head at the feed-in end of the machine and to provide the outer secondary frame of the machine with an adjustable infeeding-table, as in my improved construction no belts interfere at the feed-in end of the machine with the desirable placing of the parts and the providing of suitable construction therefor.

A shifting-lever 150 is provided for shifting the belt taking about the pulleys 67 68.

To rear of the lower cutter-head the inner frame is provided with the table 35 and may have a lip 152, adjustable to and from the lower cutter-head by means of bolts 154, taking through slots 153 and into the frame.

K is a pressure device above the lower cutter-head. It consists of a swinging frame 171, hinged on a bolt 172, taking through ears 173 on a plate 174, secured to the frame and having lugs 175 extending therefrom. The swinging frame has a shank 176 and a socket or sockets 177. The shank 176 takes and has a snug fit between the lugs 175. A link 178 swings about a bolt 179 on one of the lugs and has slot 180, taking about a bolt 181 in the other lug. The link 178 fits snugly above the shank 176 when the swinging frame 171 is in depressed or normal position, and the bolts 179 and 181, with the link 178, hold the swinging frame securely in depressed position. Each of the sockets 177 has a bore 186 for receiving a shank 187 of a pressure-foot 188. At its upper end the socket has an internally-threaded bore 191 for receiving a bolt 192. A bolt 193 takes slidably through the bolt 192 and is screwed into the top of the pressure-foot shank 187. A spring 194 is received by a pocket 195 and takes between the upper face of the pressure-foot shank 187 and the lower face of the bolt 192. The bolt 192 by its adjustment serves to regulate the tension of the spring. The bolt 193 by its adjustment serves to regulate the downward limit of the pressure-foot 188. Each pressure-foot has an upwardly-inclined face at its lower feeding-in end.

L is a chip-breaker device for the upper cutter-head and embraces a swinging frame 201, having a bearing 202, taking about a rod 203, secured in lugs 204 to the frame of the machine. The frame 201 has a planed face 205 for receiving a similar planed end of a chip-breaker support 206, bolts 207 taking into the support through slots 208 in the swinging frame 201, and thereby permitting adjustment of the support toward and away from the cutter-head. At its lower end the support carries a pressure bar or foot 211, adjustable thereon to and from the cutter-head by means of having bolts 212 take through slots 213 in the support and screwing into the pressure-bar. The support carries a rod 215, upon which a pressure-lever 216 is adapted to swing. The pressure-lever has a downward extension 218, a rearward extension 219, and a weight 217. The lever has a bolt 221, secured by set-nut 222 and normally held out of contact with the support by a spring 223. A bolt 225 limits downward movement of the pressure-bar.

M is a holddown device for holding the stock to the bed while being operated upon by the top and side cutter-heads after the cut of the top head. It comprises a swinging frame 231, pivoted on a bolt 232, taking through lugs 233 on the frame. The swinging frame is preferably bifurcated, as shown at 234, the forks extending to either side of and fitting snugly against an extension 235. A cross-piece 236 is secured to the extension by means of a hand-wheel and screw 237 and is adapted to turn thereon and take snugly against the swinging frame for holding the latter rigidly in place when in normal lowered operative position. The swinging frame has adjustably secured thereto a pair of slides 241, adjustably held in position by means of bolts 242, taking through slots 243 in the slides and into the swinging frame. These slides are adjustable transversely of the bed of the machine and at their forward ends carry slides 245, which are given an up-and-down adjustment by means of bolts 246 and held securely in place by set-bolts 247. The slides 245 carry feet 248, to which blocks 249 are adapted to be secured.

The outer side head F is mounted on a slide 255, having a rearward extension 256. It also has a forward extension 257, taking about the cutter-head, the inner end of the same being spanned by a plate 258, removably secured to the slide and forward extension by bolts 259. The slide 255 is adjustable transversely of the bed on guide 260 by means of a screw-shaft 261, screwing through lug 262 on the slide and collared to the outer secondary frame, a hand-wheel 264 being attached to the screw-shaft. The cutter-head F is mounted on a saddle 266, secured to the slide by means of a bolt 267, on which the saddle may be swung out of vertical position for giving an angling cut. The slide also carries a chip-breaker 270 for the cutter-head F. The chip-breaker is swingingly secured to the slide by bolt 271, screwing into any one of holes 272 for bringing the chip-breaker nearer to or farther away from the cutter-head F. A cable 273 is secured to the rear end of the chip-breaker and takes over an idler 274 and carries a weight 275 for giving resistance to the chip-breaker. The rearward extension also carries a side-gage slide 279, adjustable on the rearward extension on ways 280. A bolt 281 takes against the slide 279, and a bolt 276 takes through a slot 277 into the rearward extension to limit its outward movement. The side gage proper, 278, is mounted on the slide by having a set-bolt 284 take through a slot 285 in the gage into the slide 279 for setting the gage in adjusted position to and from the side head on ways 282. In my improved construction when the hand-wheel 264 is turned the slide 255, together with all the superimposed parts—namely, the side head F, the spanning-plate 258, chip-breaker 270, and the side gage 278—are moved simultaneously while retaining their relative adjusted positions, permitting these adjustments to be accurately retained while making adjustment sidewise for greater or less width in stock. The spanning-plate 258 also provides a support for the stock next to the side cutter-head, and thereby provides a continuous support for the stock. This spanning-plate may also be removed—for instance, to permit the side cutter-head to be swung to substantial extent with its upper end inwardly for angling cutting.

I claim—

1. In a molding-machine, the combination of a lower cutter-head cutting first, an upper cutter-head cutting next, and side cutter-heads cutting thereafter, with a plurality of pairs of feeding-in rolls having their upper rolls driven down, and a counter-shaft for turning the cutter-heads located at the feed-out end of the machine, substantially as described.

2. In a molding-machine, the combination of a lower cutter-head cutting first, an upper cutter-head cutting next, and side cutter-heads cutting thereafter, with a counter-shaft for turning the cutter-heads located at the feed-out end of the machine, and an adjustable connection between the counter-shaft and the frame of the machine for alining the counter-shaft with relation to the frame, substantially as described.

3. In a molding-machine, the combination of a frame, a lower cutter-head cutting in advance, an upper cutter-head cutting thereafter, and two side cutter-heads cutting after the lower and upper cutter-heads, with a plurality of pairs of feeding-in rolls having their upper rolls driven down, and a counter-shaft with a frame therefor at the feed-out end of the machine for turning the cutter-heads, a plurality of rods connecting the frame of the molding-machine with the counter-shaft frame, with means at the rods for adjusting the distance between the frames, substantially as described.

4. In a molding-machine, the combination of a main frame with an outer secondary frame therefor, a lower cutter-head mounted on the outer secondary frame, with a feeding-in table located on the outer secondary frame in advance of the lower cutter-head, and means for adjusting the feeding-in table with relation to the outer secondary frame, with the lower cutter-head cutting first, an upper cutter-head mounted in the frame cutting thereafter, and side cutter-heads cutting after the upper cutter-head, feeding-in rolls having the upper rolls driven down, and a counter-shaft located at the feeding-out end of the machine for turning the cutter-heads, substantially as described.

5. In a molding-machine, the combination of a main frame, an outer secondary frame therefor, a lower cutter-head mounted at the feeding-in end of the outer secondary frame, with a supplemental frame carrying a feeding-in table, with means between the feeding-in table and the outer secondary frame for adjusting the former with relation to the latter, with feed-roll mounted in the supplemental frame, means for adjusting the feed-roll in the supplemental frame and means for turning the feed-roll from the main frame, upper feed-rolls driven down, an upper cutter-head, and side cutter-heads, with a counter-shaft located at the feed-out end of the machine for turning the cutter-heads, substantially as described.

6. In a molding-machine, the combination of a side head, slide, with a rearward extension therefor, a chip-breaker, and a side gage adjustably secured to the rearward extension, with means for sidewise adjustment of the slide for simultaneously adjusting the side head, chip-breaker and side gage, substantially as described.

7. In a molding-machine, the combination of a side head, slide, forward extension therefor, a side head and a saddle therefor secured to the slide between the slide and the forward extension, with a removable spanner-plate secured to the inner edge of the slide and forward extension for supporting the stock when passing the side head, with means for adjusting the slide sidewise and thereby simultaneously adjusting the slide, forward extension, side head and spanner-plate, substantially as described.

8. In a molding-machine, the combination of a main frame, an outer secondary frame therefor, guideway between the main frame and the outer secondary frame, means for adjusting the outer secondary frame up and down on the main frame, a lower cutter-head mounted at the feed-in end of the outer secondary frame, a supplemental frame carrying a feed-in table in advance of the lower cutter-head mounted on the outer secondary frame, means for adjusting the supplemental frame and its table up and down upon the outer secondary frame, with side cutter-heads mounted on the outer secondary frame at its feed-out end, and a counter-shaft at the feed-out end of the machine for turning the cutter-heads, substantially as described.

9. In a molding-machine, the combination of a frame, a lower cutter-head, an upper cutter-head, and side cutter-heads, with a counter-shaft and frame therefor for turning the cutter-heads located at the feed-out end of the machine, with a plurality of rods connecting the frame of the molder with the frame of the counter-shaft, with means for adjusting the distance between the frames.

10. In an outside molding-machine, the combination of a lower cutter-head, an upper cutter-head, with side cutter-heads, and a counter-shaft for operating the cutter-heads located at the feed-out end of the machine for the uses and purposes described.

In testimony whereof I have signed my name hereto in the presence of two subscribing witnesses.

JOHN R. THOMAS.

Witnesses:
PARKE S. JOHNSON,
PHIL TOZZER.